United States Patent
Mochida et al.

(10) Patent No.: US 6,739,834 B2
(45) Date of Patent: May 25, 2004

(54) FLEXBEAM

(75) Inventors: Tomomi Mochida, Tokyo (JP); Tsutomu Nagayoshi, Tokyo (JP); Tetsuro Sato, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 19 days.

(21) Appl. No.: 10/289,368

(22) Filed: Nov. 7, 2002

(65) Prior Publication Data

US 2003/0086786 A1 May 8, 2003

(30) Foreign Application Priority Data

Nov. 8, 2001 (JP) .................................... P. 2001-343133

(51) Int. Cl.$^7$ ................................................. F01D 5/00
(52) U.S. Cl. ................................................... 416/134 A
(58) Field of Search .................... 416/134 A, 134 R, 416/141 R, 230 A, 138

(56) References Cited

U.S. PATENT DOCUMENTS

| | | | |
|---|---|---|---|
| 5,047,106 A | | 9/1991 | Matsumoto et al. |
| 5,242,267 A | * | 9/1993 | Byrnes et al. .......... 416/134 A |
| 5,358,381 A | | 10/1994 | Covington et al. |
| 5,431,538 A | * | 7/1995 | Schmaling et al. ..... 416/134 A |
| 5,690,474 A | * | 11/1997 | Byrnes et al. .......... 416/134 A |
| 5,738,494 A | * | 4/1998 | Schmaling ............. 416/134 A |

FOREIGN PATENT DOCUMENTS

| | | |
|---|---|---|
| EP | 0 323 857 | 7/1989 |
| JP | 2583259 | 11/1996 |
| JP | 10-287297 | 10/1998 |

OTHER PUBLICATIONS

European Search Report dated Feb. 11, 2003.

* cited by examiner

Primary Examiner—Edward K. Look
Assistant Examiner—J. M. McAleenan
(74) Attorney, Agent, or Firm—McGinn & Gibb, PLLC

(57) ABSTRACT

A flexbeam having a flapping part and a feathering and lead-lag part has a first composite member having a plurality of first layers and a plurality of second layers; and a second composite member having a plurality of loop members; wherein the flapping part is constructed such that the first layers of the first composite member and the second composite members arranged on the leading edge side and the trailing edge side of the beam, are jointed integrally and also the second composite members are separated by the second layers of the first composite member in a vertical direction and are jointed to the second layers, and the feathering and lead-lag part is constructed by jointing integrally the second layers of the first composite member arranged in a center of thickness, and the second composite members arranged on upper and lower surfaces of the second layers.

8 Claims, 2 Drawing Sheets

FLEXBEAM

BACKGROUND OF THE INVENTION

1. Field of the Invention

The present invention relates to a flexbeam and, more particularly, a flexbeam having a bearingless hub structure of a helicopter.

2. Description of the Related Art

The blades of the helicopter are coupled to the rotor shaft via the hub so as to make respective motions of flapping, feathering, and lead lag possible. As the hub structure for causing the blades to execute such three motions, there may be listed the structure using the hinges constructed by the rolling bearing, the elastomer, or the like, the structure utilizing the elastic deformation of the joint portions of the blades whose rigidity is intentionally weakened, etc.

The hub structure of the latter, which utilizes the elastic deformation in all three motions of the blade, is normally called the "bearingless hub structure" and comprises the flexbeam having the flapping part having flexibility, and the feathering and lead-lag part. Three motions of the blade can be attained by the deflection of the flexbeam. If such bearingless hub structure is employed, normally the controllability and the maneuverability can be improved since the hub moment is transmitted easily to the fuselage side.

As an example of the flexbeam structure in the prior art (referred to as the "conventional structure (1)" hereinafter), as set forth in Japanese Patent No. 2583259, there is proposed the structure in which the flapping part is constructed by jointing integrally the center member, which is made of woven-fabric composite material and is arranged in the center portion in the chordwise direction, and frame members, which is made of composite member whose fibers are oriented in one direction (referred to as the "unidirectional member" hereinafter) and are arranged at the leading edge side and the trailing edge side of the center member. In this structure, the jointed surfaces between the center member and the frame members are almost normal planes that extends in the spanwise direction.

Also, as an example of another flexbeam structure (referred to as the "conventional structure (2)" hereinafter), as set forth in Patent Application Laid-Open No. Toku-Kai-Hei 10-287297, there is proposed the structure in which the flapping part is constructed by the center member, which is arranged in the center of thickness, upper and lower members, which are arranged on the upper surface side and the lower surface side, and the unidirectional members, which are arranged between the center member and the upper and lower members.

In the conventional structure (1), the load transmitted to the flapping part of the flexbeam is transmitted to the center member via the frame members. In this case, since the jointed surfaces between the center member and the frame members are almost perpendicular to each other, the stress and the moment are not smoothly transmitted in some cases and thus excessive shear stress and strain are caused in the inside of the frame members. Since the frame members are formed of the unidirectional member, their shear strength is low. For this reason, the shear stress caused in the inside of the frame members must be reduced.

Also, in the conventional structure (1), if the above-mentioned load is applied, a strain distribution becomes discontinuous at the jointed surfaces between the center member and the frame members and thus the large shear stress is generated in neighborhood of the jointed surfaces. Such shear stress generated in neighborhood of the jointed surfaces must also be reduced.

While, in the conventional structure (2), the load transmitted to the flapping part of the flexbeam is transmitted to the center member and the upper and lower members via the unidirectional members. In this case, the jointed surfaces between the unidirectional members and the upper and lower members are arranged near the center in the beam-thickness direction, room for improvement in the reduction of the shear stress generated in neighborhood of the jointed surfaces is still left.

SUMMARY OF THE INVENTION

A subject of the present invention is to improve structural strength of a flexbeam remarkably.

In order to overcome the above subject, as shown in FIG. 1 to FIG. 3, for example, the present invention set forth in a first aspect provided a flexbeam having a flapping part whose cross section in a direction perpendicular to a spanwise direction is formed as a rectangle, and a feathering and lead-lag part whose cross section in the direction perpendicular to the spanwise direction is formed as two substantially Y-shaped cross sections that are coupled symmetrically via a flat part, comprising: a first composite member having a plurality of first layers, which extend in the spanwise direction so as to have a plurality of fiber orientations and are laminated in a vertical direction and arranged in a center portion in a chordwise direction, and a plurality of second layers, which extend from a leading edge to a trailing edge of a beam so as to put the first composite member therebetween; and a second composite member having a plurality of loop members, which extend in the spanwise direction so as to have the fiber orientations in a same direction as an extending direction; wherein the flapping part is constructed such that the first layers of the first composite member and the second composite members arranged on the leading edge side and the trailing edge side of the beam, are jointed integrally and also the second composite members are separated by the second layers of the first composite member in a vertical direction and are jointed to the second layers, and the feathering and lead-lag part is constructed by jointing integrally the second layers of the first composite member arranged in a center of thickness, and the second composite members arranged on upper and lower surfaces of the second layers.

According to the present invention set forth in the first aspect, the flapping part is constructed by jointing integrally the first layers of the first composite members, which are laminated in plural in the vertical direction and arranged in the center portion in the chordwise direction, and the second composite members, which are arranged on the leading edge side and the trailing edge side of the beam, and also the second composite members are separated vertically by the second layers of the first composite members. Hence, a contact area between the first composite members and the second composite members can be increased in the flapping part rather than the conventional structure.

Therefore, the load applied to the feathering and lead-lag part can be transmitted effectively to the first composite members arranged in the flapping part via the second composite members. As a result, the shear stress generated in the second composite members and the shear stress generated in the neighborhood of the jointed surfaces between the first composite members and the second composite members can be reduced.

In the present invention set forth in a second aspect, in the flexbeam according to the first aspect, as shown in FIG. 2, for example, the flapping part has the first composite members for covering upper and lower surfaces of the beam.

According to the present invention set forth in the second asepct, in addition to advantages of the present invention according to the first aspect, the flapping part has the first composite members that cover the upper and lower surfaces of the beam in full width. Therefore, the jointed surfaces between the first composite members, which are arranged in the center portion in the chordwise direction, and the second composite members, which are arranged on the leading edge side and the trailing edge side of the first composite members, can be prevented from being exposed from the upper and lower surfaces of the beam. As a result, generation of cracks in the beam and spread of the cracks can be prevented.

In the present invention set forth in a third asepct, in the flexbeam according to the first or second aspect, as shown in FIG. 2 and FIG. 3, for example, the first composite member disappears from the flapping part to the feathering and lead-lag part so as to leave a portion that separates the second composite member in the vertical direction.

According to the present invention set forth in the third aspect, in addition to advantages of the present invention according to the first or second aspect, the first composite member disappears gradually from the flapping part to the feathering and lead-lag part to leave partially the portion that separates the second composite members in the vertical direction. Therefore, the first composite member that scarcely bears the load can be omitted as much as possible in the feathering and lead-lag part. As a result, the weight of the product and the material cost and the processing cost in manufacture can be reduced.

In the present invention set forth in a fourth aspect, in the flexbeam according to the first, second or third aspect, as shown in FIG. 2 and FIG. 3, for example, the second composite member is separated in the chordwise direction at the flapping part and is separated at the bent portion of Y-shaped cross section of the feathering and lead-lag part, and the portions separated at the flapping part and portions separated at the feathering and lead-lag part are continued in the spanwise direction respectively.

According to the present invention set forth in the fourth aspect, in addition to advantages-of the present invention according to the first, second or third aspect, the second composite members are separated in the flapping part in the back-and-forth direction and are separated at the almost Y-shaped folded portion in the feathering and lead-lag part, and also the portions separated at the flapping part and the portions separated at the feathering and lead-lag part are continued in the spanwise direction respectively. Therefore, the second composite members can be arranged regularly over the entire beam. As a result, high quality product with large strength can be obtained.

DETAILED DESCRIPTION OF THE PREFERRED EMBODIMENTS

An embodiment of the present invention will be explained in detail with reference to the drawings hereinafter.

Figure 1:
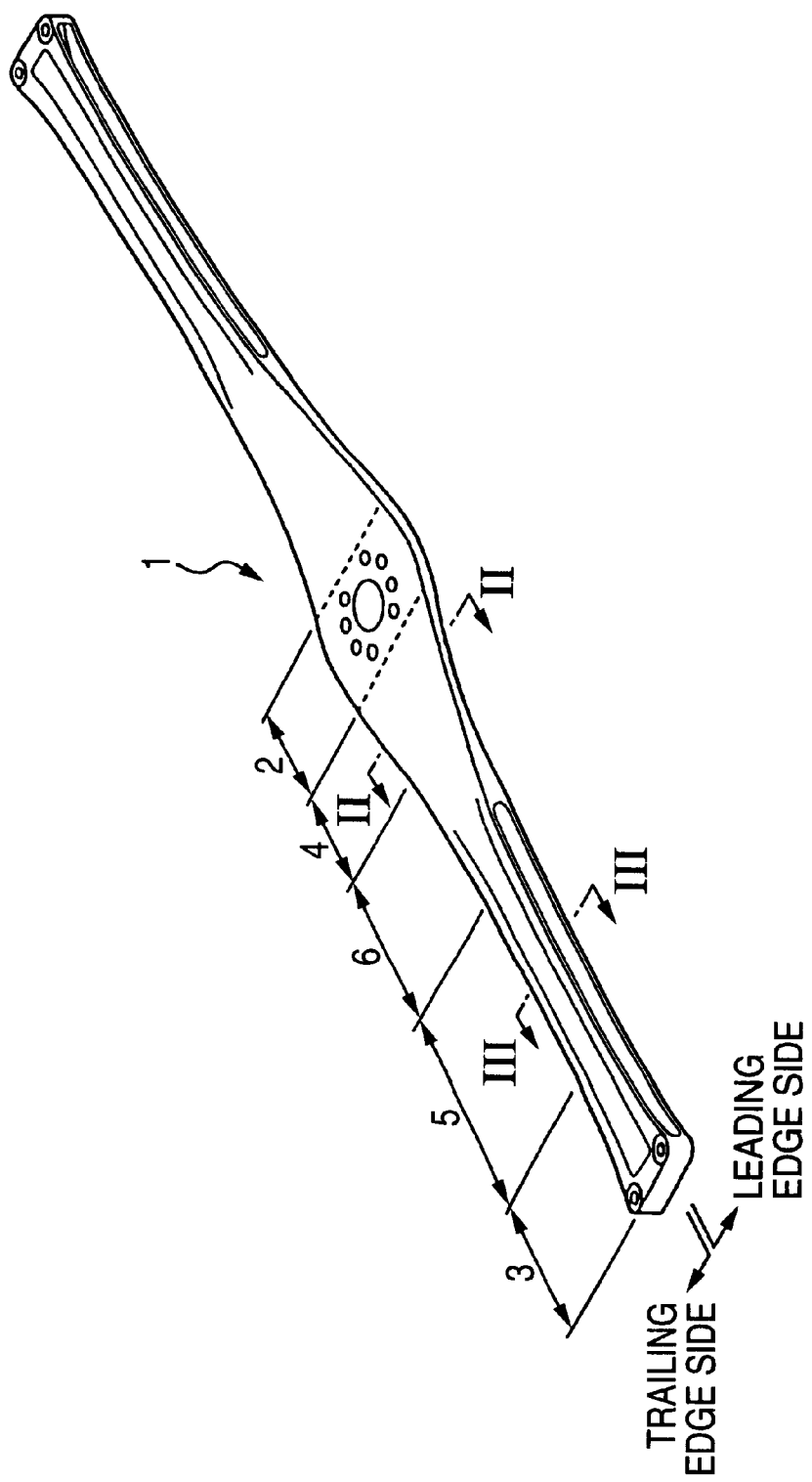
FIG. 1 is a perspective view of a flexbeam according to an embodiment of the present invention.

In the present embodiment, a flexbeam 1 constituting the bearingless hub structure of the helicopter will be explained hereunder. The flexbeam 1 according to the present embodiment is a long and narrow plate-like parts shown in FIG. 1. A rotor-shaft fitting portion 2 and a blade fitting portions 3 are provided to the center portion and both end portions of the flexbeam in the length direction respectively.

A flapping part 4 is constructed next to both sides of the rotor-shaft fitting portion 2. The flapping part 4 has an elastic structure whose cross section is formed like a rectangle (see FIG. 2) and permits a flapping motion of the blade. Also, a feathering and lead-lag part 5 is constructed next to the blade fitting portions 3. The feathering and lead-lag part 5 has an elastic structure whose cross section is formed as two substantially Y-shaped cross sections coupled symmetrically via a flat part (see FIG. 3). Such elastic structure enables the blade to take a feathering motion and a leading-lagging motion.

Figure 2:
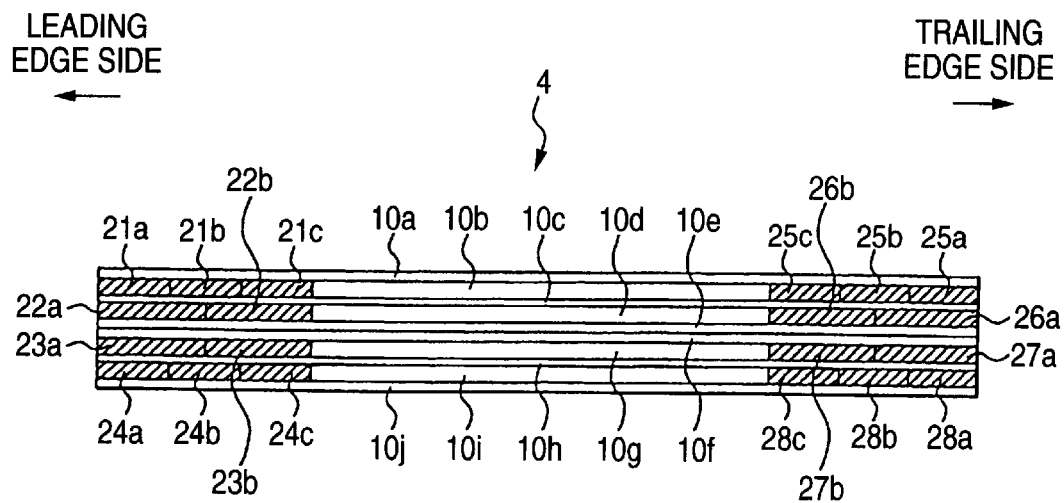
FIG. 2 is an enlarged sectional view of a II—II part (flapping part) in FIG. 1.
Figure 3:
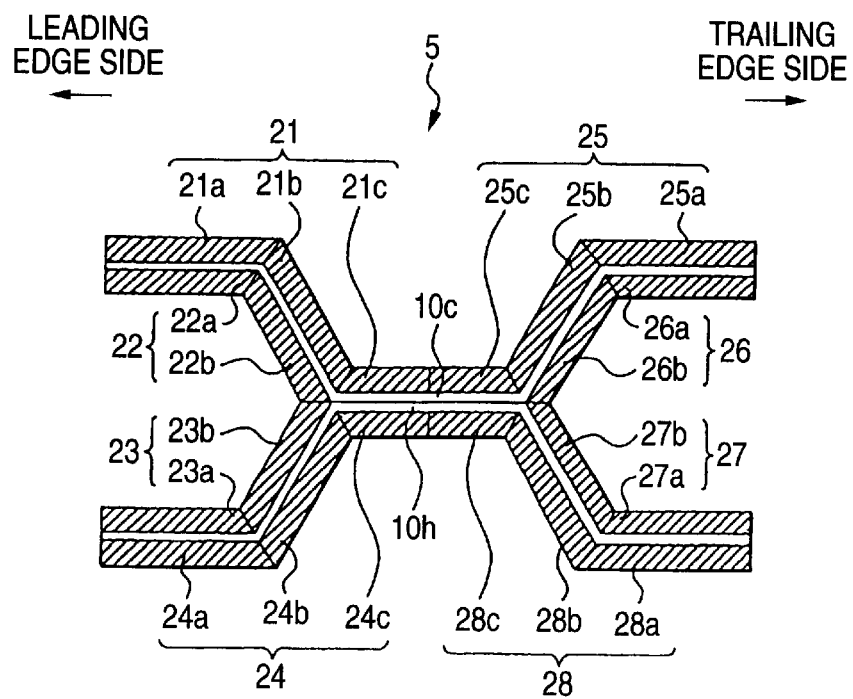
FIG. 3 is an enlarged sectional view of a III—III part (feathering and lead-lag part) in FIG. 1.

A transition portion 6 is such a portion that connects the flapping part 4 and the feathering and lead-lag part 5. The rectangular cross section of the flapping part 4 shown in FIG. 2 is deformed gradually in the transition portion 6, and then is shaped into the cross section, in which two substantially Y-shaped cross sections are coupled symmetrically via the flat part, as shown in FIG. 3, in the feathering and lead-lag part 5.

The flapping part 4 consists of a first composite member that extends in the spanwise direction and has a plurality of fiber orientations, and a second composite member that extends in the spanwise direction to have the fiber orientation in the same direction as the extending direction and has plurality of loop members formed by winding one roving continuously.

The first composite member is a tape-like glass fiber reinforced composite member that is obtained by curing previously the prepreg, the glass fiber of which is impregnated with thermosetting resin, (referred to as a "tape member" hereinafter). In the present embodiment, the glass fiber constituting the first composite member is formed like a textile. In this case, the member that is obtained by laminating the above tape member in plural layers and coupling them is also called the first composite member.

The second composite member is a semi-cured loop member whose glass fiber that is extended in one direction is impregnated with the thermosetting resin, and can be prepared by using the filament winding apparatus. In the present embodiment, epoxy resin is used as the thermosetting resin.

As shown in FIG. 2, the flapping part 4 is constructed by jointing integrally a first composite member (10a to 10j) that is laminated in plural in the vertical direction and arranged in the center portion in the chordwise direction, and a second composite member (21a to 28c) that is arranged on the leading edge side and the trailing edge side of the first composite member (10a to 10j).

The first composite member is constructed by laminating ten sheets, i.e., two sheets (10a and 10j) for covering upper and lower surfaces of the beam in full width, four sheets (10b, 10d, 10g, and 10i) arranged in the middle portion in the chordwise direction, and four sheets (10c, 10e, 10f, and 10h) arranged in the middle portion in the chordwise direction and projected to the leading edge side and the trailing edge side, vertically in total and jointing them (see FIG. 2). Out of them, four sheets (10c, 10e, 10f, and 10h), which are arranged in the middle portion in the chordwise direction and projected to the leading edge side and the trailing edge side, perform a function of dividing the second composite member in the vertical direction (see FIG. 2).

The second composite member is constructed by a group (21, 22, 23 and 24) arranged on the leading edge side of the first composite member and a group (25, 26, 27 and 28) arranged on the trailing edge side of the first composite member. As described above, the second composite member is divided by four sheets (10c, 10e, 10f, and 10h) of the first composite member, which are arranged in the middle portion in the chordwise direction and projected to the leading edge side and the trailing edge side, in the vertical direction respectively (see FIG. 2)

Also, as shown in FIG. 2, the second composite member in the present embodiment is divided in the back-and-forth direction. The group (21, 22, 23 and 24) that are arranged on the leading edge side of the first composite member will be explained herein. The second composite members 21 and 24 that are arranged near the upper and lower surfaces of the beam are divided into three portions (21a to 21c, 24a to 24c) in the back-and-forth direction, while the second composite members 22 and 23 that are arranged near the center in the beam-thickness direction are divided into two portions (22a and 22b, 23a and 23b) in the back-and-forth direction.

As shown in FIG. 3, the feathering and lead-lag part 5 is constructed by jointing integrally the first composite member (10c and 10h), which are arranged in the center of thickness, and the second composite members (21a to 28c), which are arranged on upper and lower surfaces of the first composite member (10c and 10h).

The first composite member disappears gradually from the flapping part 4 to the feathering and lead-lag part 5 to leave the portion (10c and 10h) for dividing the second composite members (21a to 28c) in the vertical direction. More particularly, eight sheets of the first composite members constituting the flapping part 4, i.e., two sheets (10a and 10j) for covering the upper and lower surfaces of the beam in full width, four sheets (10b, 10d, 10g, and 10i) arranged in the middle portion in the chordwise direction, and two sheets (10e and 10f) of four sheets arranged in the middle portion in the chordwise direction and projected to the leading edge side and the trailing edge side, are reduced gradually in thickness and width via the transition portion 6, and only the first composite members (10c and 10h) for dividing the second composite members (21a to 28c) in the vertical direction are left in the feathering and lead-lag part 5.

The second composite members (21 and 25) that are arranged on the upper surfaces of the first composite members (10c and 10h) are the second composite members that are arranged near the upper surfaces of the beam in the flapping part 4 and are jointed via the coupling portion between the substantially Y-shaped cross sections (i.e., flat part) (see FIG. 3).

As shown in FIG. 3, the second composite members (21 and 25) are divided into three portions (21a to 21c, 25a to 25c) by the almost Y-shaped folded portions. Divided portions correspond to portions (21a to 21c, 25a to 25c) that are separated at the flapping part 4. In this case, the feathering and lead-lag part 5 is vertically symmetrical in structure. Thus, since the dividing mode, etc. of the second composite members (24 and 28) arranged on the lower surfaces of the first composite members (10c and 10h) are substantially identical to the second composite members (21 and 25) arranged on the above upper surfaces, their explanation will be omitted herein.

Also, the second composite members (22 and 23) are arranged on the leading edge side of the feathering and lead-lag part 5. These are the second composite-members that are arranged near the center of the flapping part 4 in the beam-thickness direction and jointed by the almost Y-shaped folded portion in the middle in the beam-thickness direction (see FIG. 3).

As shown in FIG. 3, the second composite members (22 and 23) are divided into two portions (22a and 22b, 23a and 23b) by the almost Y-shaped folded portion. Divided portions correspond to the portions (22a and 22b, 23a and 23b) separated at the flapping part 4. In this case, the feathering and lead-lag part 5 is symmetrical in the back-and forth direction in structure. Thus, since the dividing mode, etc. of the second composite members (26 and 27) arranged on the trailing edge side of the feathering and lead-lag part 5 are substantially identical to the second composite members (22 and 23) arranged on the above leading edge side, their explanation will be omitted herein.

In order to joint the first composite members (10a to 10j) and the second composite members (21a to 28c), the conventional method can be employed. For example, cure molding of the second composite members (21a to 28c) and jointing of the second composite members (21a to 28c) to the first composite members (10a to 10j) are executed simultaneously by arranging the second composite members (21a to 28c), which are semi-cured loop members, on the leading edge side and the trailing edge side of the first composite members (10a to 10j), which are laminated and cured previously, and then applying the pressure to them by using the side molds.

According to the flexbeam 1 of the present embodiment, the flapping part 4 is constructed by jointing integrally the first composite members (10a to 10j), which are laminated in the vertical direction and arranged in the center portion in the chordwise direction, and the second composite members (21a to 28c), which are arranged on the leading edge side and the trailing edge side of the first composite members (10a to 10j), and also the second composite members (21a to 28c) are divided vertically by the portion, which are protruded to the leading edge side and the trailing edge side of the first composite members. Hence, a contact area between the first composite members (10a to 10j) and the second composite members (21a to 28c) can be increased in the flapping part 4 rather than the conventional structure.

Therefore, the load applied to the feathering and lead-lag part 5 can be transmitted effectively to the first composite members (10a to 10j) arranged in the flapping part 4 via the second composite members (21a to 28c). As a result, the shear stress generated in the second composite members (21a to 28c) and the shear stress generated in the neighborhood of the jointed surfaces between the first composite members (10a to 10j) and the second composite members (21a to 28c) can be reduced.

In this case, since the load applied to the feathering and lead-lag part 5 can be transmitted effectively to the first composite members (10a to 10j) arranged in the flapping part 4 via the second composite members (21a to 28c), the hub moment, etc. can be transmitted sufficiently to the fuselage side. Therefore, advantages of the bearingless hub structure can be utilized sufficiently, and such structure can contribute to improvement of the controllability and the maneuverability of the helicopter.

Also, according to the flexbeam 1 of the present embodiment, the flapping part 4 has the first composite members (10a to 10j) that cover the upper and lower surfaces of the beam in full width. Therefore, the jointed surfaces between the first composite members (10b, 10c, 10d, 10e, 10f, 10g, 10h, and 10i), which are arranged in the center portion in the chordwise direction, and the second composite members (21a to 28c), which are arranged on the leading edge side and the trailing edge side of the first composite members (10b, 10c, 10d, 10e, 10f, 10g, 10h, and 10i), can be prevented from being exposed from the upper and lower surfaces of the beam. As a result, generation of cracks in the beam and spread of the cracks can be prevented.

In addition, according to the flexbeam 1 of the present embodiment, the first composite member (10a to 10j) disappears gradually from the flapping part 4 to the feathering and lead-lag part 5 to leave the portion (10c and 10h) for dividing the second composite members (21a to 28c) in the vertical direction. Therefore, the first composite member that scarcely bears the load can be omitted as much as possible in the feathering and lead-lag part 5. As a result, the weight of the product and the material cost and the processing cost in manufacture can be reduced.

Further, according to the flexbeam 1 of the present embodiment, the second composite members (21a to 28c) are separated in the flapping part 4 in the back-and-forth direction and are separated at the almost Y-shaped folded portion in the feathering and lead-lag part 5, and also the portions separated at the flapping part 4 and the portions separated at the feathering and lead-lag part 5 are continued in the spanwise direction respectively. Therefore, the second composite members (21a to 28c) can be arranged regularly over the entire beam. As a result, high quality product with large strength can be obtained.

In this case, the first composite member (10a to 10j) is constructed by the woven fabric-like glass fiber in the above embodiment. But the first composite member is not limited to this. For example, the prepreg sheet whose fiber orientation is set in one direction is prepared by infiltrating the thermosetting resin into the glass fiber that is extended in one direction, and then the first composite member (10a to 10j) can be constructed by laminating this prepreg sheet to cure such that each sheet has a 25% thickness while changing the fiber orientation by 45° every sheet.

Also, a ratio of the width of the first composite member (10a to 10j) to the width of the second composite members (21a to 28c) in the flapping part 4 and a ratio of the thickness of the second composite members (21a to 28c) to the thickness of the first composite member (10c and 10h) in the feathering and lead-lag part 5 can be decided appropriately in response to the size of the bearingless hub structure to which the flexbeam 1 is fitted.

According to the present invention set forth in the first aspect, the contact area between the first composite members and the second composite members can be increased in the flapping part, and also the load applied to the feathering and lead-lag part can be transmitted effectively to the first composite members arranged in the flapping part via the second composite members. Therefore, the shear stress generated in the second composite members and the shear stress generated in the neighborhood of the jointed surfaces between the first composite members and the second composite members can be reduced. As a result, the structural strength can be improved considerably.

According to the present invention set forth in the second aspect, in addition to the advantage of the present invention set forth in the first aspect, the jointed surfaces between the first composite members, which are arranged in the center portion in the chordwise direction, and the second composite members, which are arranged on the leading edge side and the trailing edge side of the first composite members, can be prevented from being exposed from the upper and lower surfaces of the beam. As a result, generation of cracks in the beam and spread of the cracks can be prevented.

According to the present invention set forth in the third aspect, in addition to the advantage of the present invention set forth in the first or second aspect, the first composite member that scarcely bears the load can be omitted as much as possible in the feathering and lead-lag part. As a result, the weight of the product and the material cost and the processing cost in manufacture can be reduced.

According to the present invention set forth in the fourth aspect, in addition to the advantage of the present invention set forth in the first, second or third aspect, the second composite members can be arranged regularly over the entire beam. As a result, the high quality product with large strength can be obtained.

The disclosure of Japanese Patent Application No. 2001-343133 filed on Nov. 8, 2001 including the specification, drawings and abstract is incorporated herein by reference in its entirety.

While the presently preferred embodiment of the present invention has been shown and described, it is to be understood that this disclosure is for the purpose of illustration and that various changes and modifications may be made without departing from the scope of the present invention as set forth in the appended claims.

What is claimed is:

1. A flexbeam having a flapping part whose cross section in a direction perpendicular to a spanwise direction is formed as a rectangle, and a feathering and lead-lag part whose cross section in the direction perpendicular to the spanwise direction is formed as two substantially Y-shaped cross sections that are coupled symmetrically via a flat part, comprising:

a first composite member having a plurality of first layers, which extend in the spanwise direction so as to have a plurality of fiber orientations and are laminated in a vertical direction and arranged in a center portion in a chordwise direction, and a plurality of second layers, which extend from a leading edge to a trailing edge of a beam so as to put the first composite member therebetween; and a second composite member having a plurality of loop members, which extend in the spanwise direction so as to have the fiber orientations in a same direction as an extending direction;

wherein the flapping part is constructed such that the first layers of the first composite member and the second composite members arranged on the leading edge side and the trailing edge side of the beam, are jointed integrally and also the second composite members are separated by the second layers of the first composite member in a vertical direction and are jointed to the second layers, and the feathering and lead-lag part is constructed by jointing integrally the second layers of the first composite member arranged in a center of thickness, and the second composite members arranged on upper and lower surfaces of the second layers.

2. The flexbeam according to claim 1, wherein the flapping part has the first composite members for covering upper and lower surfaces of the beam.

3. The flexbeam according to claim 2, wherein the first composite member disappears from the flapping part to the feathering and lead-lag part so as to leave a portion that separates the second composite member in the vertical direction.

4. The flexbeam according to claim 3, wherein the second composite member is separated in the chordwise direction at the flapping part and is separated at the bent portion of Y-shaped cross section of the feathering and lead-lag part, and the portions separated at the flapping part and portions separated at the feathering and lead-lag part are continued in the spanwise direction respectively.

5. The flexbeam according to claim 2, wherein the second composite member is separated in the chordwise direction at the flapping part and is separated at the bent portion of Y-shaped cross section of the feathering and lead-lag part, and the portions separated at the flapping part and portions separated at the feathering and lead-lag part are continued in the spanwise direction respectively.

6. The flexbeam according to claim 1, wherein the first composite member disappears from the flapping part to the feathering and lead-lag part so as to leave a portion that separates the second composite member in the vertical direction.

7. The flexbeam according to claim 3, wherein the second composite member is separated in the chordwise direction at the flapping part and is separated at the bent portion of Y-shaped cross section of the feathering and lead-lag part, and the portions separated at the flapping part and portions separated at the feathering and lead-lag part are continued in the spanwise direction respectively.

8. The flexbeam according to claim 1, wherein the second composite member is separated in the chordwise direction at the flapping part and is separated at the bent portion of Y-shaped cross section of the feathering and lead-lag part, and the portions separated at the flapping part and portions separated at the feathering and lead-lag part are continued in the spanwise direction respectively.

* * * * *